(12) United States Patent
Brockerhoff et al.

(10) Patent No.: US 9,484,791 B2
(45) Date of Patent: Nov. 1, 2016

(54) REMOTE ROTOR PARAMETER SENSOR FOR ELECTRIC DRIVES

(75) Inventors: Philip Georg Brockerhoff, Munich (DE); Mattias Welponer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 480 days.

(21) Appl. No.: 13/570,079

(22) Filed: Aug. 8, 2012

(65) Prior Publication Data

US 2014/0042876 A1    Feb. 13, 2014

(51) Int. Cl.
*H02K 11/00* (2016.01)
*H02P 23/14* (2006.01)

(52) U.S. Cl.
CPC .............. *H02K 11/35* (2016.01); *H02K 11/20* (2016.01); *H02K 11/21* (2016.01); *H02K 11/25* (2016.01); *B60L 2220/44* (2013.01); *Y02T 10/641* (2013.01)

(58) Field of Classification Search
CPC .. H02K 57/006; H02K 11/00; H02K 11/001; H02K 11/0078; H02P 23/14; H02P 23/0027
USPC ........................................................ 310/68 B
See application file for complete search history.

(56) References Cited

U.S. PATENT DOCUMENTS

| | | | | |
|---|---|---|---|---|
| 4,839,830 | A * | 6/1989 | Amey et al. ..................... | 702/42 |
| 5,406,154 | A * | 4/1995 | Kawaguchi et al. ....... | 310/67 R |
| 5,691,611 | A * | 11/1997 | Kojima et al. ........... | 318/400.04 |
| 5,852,351 | A * | 12/1998 | Canada ................ | G01R 31/343 |
| | | | | 318/490 |
| 6,041,287 | A * | 3/2000 | Dister et al. .................. | 702/182 |
| 6,140,727 | A * | 10/2000 | Goto et al. ..................... | 310/155 |
| 6,199,018 | B1 * | 3/2001 | Quist .................. | G01M 13/028 |
| | | | | 318/806 |
| 6,262,550 | B1 * | 7/2001 | Kliman et al. ................ | 318/565 |
| 6,864,802 | B2 * | 3/2005 | Smith .................... | G01D 21/00 |
| | | | | 257/678 |
| 6,920,794 | B2 * | 7/2005 | Luo et al. ........................ | 73/660 |
| 7,166,978 | B2 * | 1/2007 | Carson et al. ................ | 318/432 |
| 7,474,071 | B2 * | 1/2009 | Koeppl et al. ................ | 318/489 |
| 7,518,493 | B2 * | 4/2009 | Bryzek ............... | B60C 23/0408 |
| | | | | 340/442 |
| 7,646,195 | B2 * | 1/2010 | Salfelner ...................... | 324/244 |
| 7,678,585 | B2 * | 3/2010 | Zimmer .......................... | 438/3 |
| 7,688,192 | B2 * | 3/2010 | Kenny ............... | B60C 23/0408 |
| | | | | 340/447 |
| 7,821,220 | B2 * | 10/2010 | El-Ibiary ...................... | 318/600 |
| 7,954,369 | B2 * | 6/2011 | Nornes ................ | B60C 23/041 |
| | | | | 73/146 |
| 7,999,496 | B2 * | 8/2011 | Gleason et al. ............. | 318/139 |

(Continued)

FOREIGN PATENT DOCUMENTS

| | | |
|---|---|---|
| CN | 102420499 | 4/2012 |
| WO | 2011069543 | 6/2011 |

OTHER PUBLICATIONS

Infineon "Sensor Solutions for Automotive, Industrial and Consumer Applications" Nov. 2015 http://www.infineon.com/dgdl/Infineon-Sensor_Solutions_for_Automotive_Industrial_and_Customer_Appl_BR-2015_1_1-SG-v01_01-EN.pdf?fileld=5546d46250cc1fdf01513f571d1b0706.*

*Primary Examiner* — Burton Mullins
(74) *Attorney, Agent, or Firm* — Slater Matsil, LLP

(57) ABSTRACT

A rotor parameter sensor is used for electric drives. A rotor of an electric engine or motor is monitored by a sensor sensing one or more physical observables or operation parameters. Furthermore, a method and system is used for monitoring an electric engine or motor for use in electric or hybrid vehicles.

24 Claims, 1 Drawing Sheet

(56) References Cited

U.S. PATENT DOCUMENTS

| | | | | |
|---|---|---|---|---|
| 8,013,554 | B2* | 9/2011 | West et al. | 318/432 |
| 8,450,984 | B2* | 5/2013 | Sandrana | H02P 29/0061 318/490 |
| 8,571,791 | B2* | 10/2013 | Hyde et al. | 701/425 |
| 8,791,716 | B2* | 7/2014 | Tanimoto et al. | 324/765.01 |
| 2009/0280743 | A1* | 11/2009 | Gast | B23Q 1/0027 455/41.2 |
| 2010/0085002 | A1* | 4/2010 | Knauff | H02K 11/0078 318/490 |
| 2011/0148258 | A1* | 6/2011 | Tanaka et al. | 310/68 B |
| 2011/0273121 | A1* | 11/2011 | Wan | H02K 5/225 318/400.12 |
| 2012/0075070 | A1* | 3/2012 | Rai et al. | 340/10.1 |
| 2012/0136627 | A1* | 5/2012 | Jensen | 702/182 |
| 2012/0267988 | A1* | 10/2012 | Hassel | 310/68 B |

\* cited by examiner

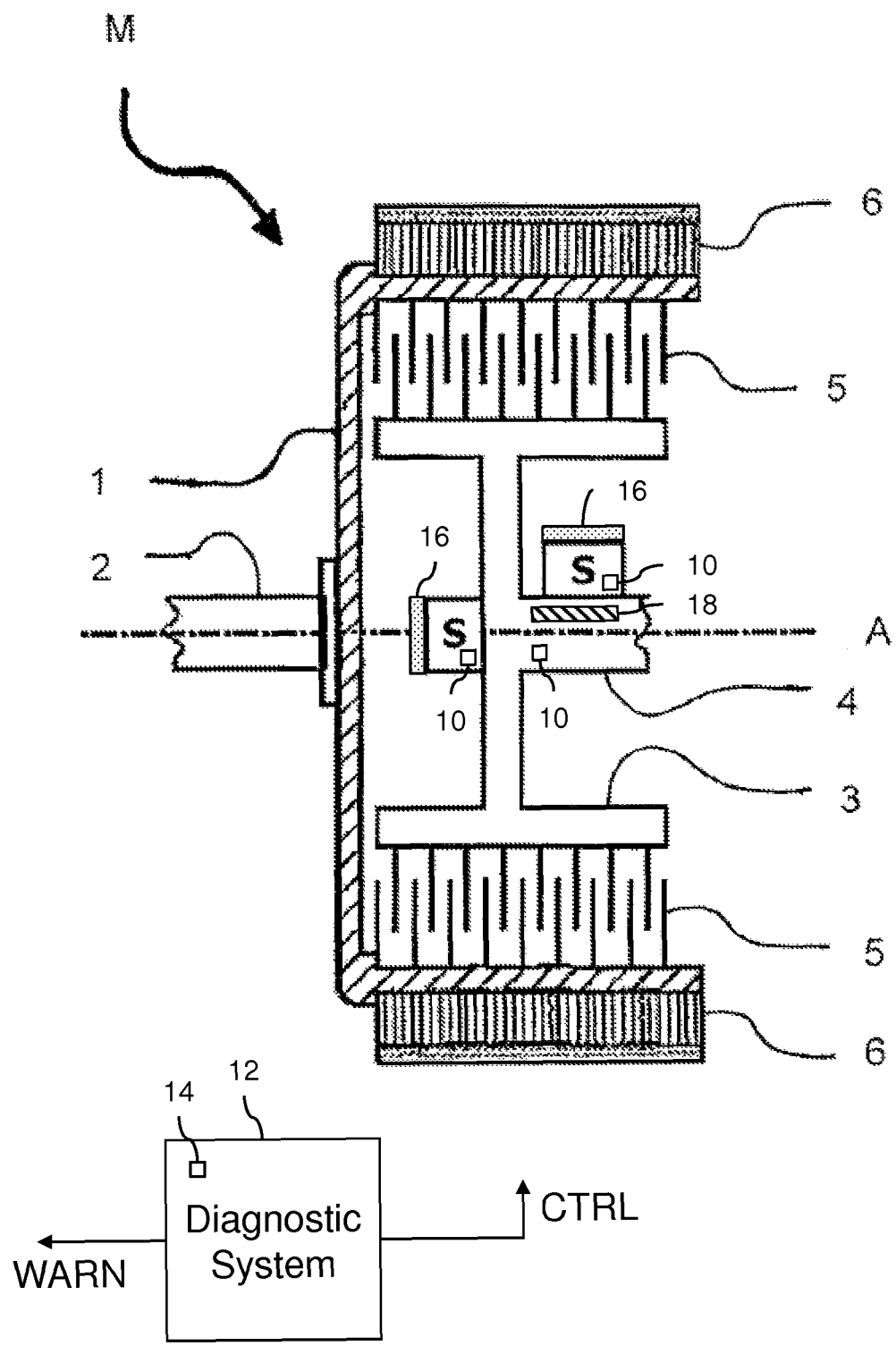

REMOTE ROTOR PARAMETER SENSOR FOR ELECTRIC DRIVES

TECHNICAL FIELD

The present invention relates to a rotor of an electric drive, an electric engine or engine and a vehicle drive apparatus for an electric driven vehicle or an electric driven train. In particular, the invention relates to a remote rotor parameter sensor for electric drives.

BACKGROUND

As vehicles improve in fuel economy, fuel cell vehicles and hybrid vehicles have been of great interest. The hybrid vehicle includes as its component a gasoline engine, a transmission, an inverter, a battery, and a motor as well as their controllers. Such vehicles require a motor that is highly reliable, efficient, variable in rpm and superior in control.

Environmental requirements like reduction of carbon dioxide emissions require improvement in fuel economy and enhancement of electric machines for driven vehicles of all kinds. Electrical machinery and its use as power source or additional power source in a motor vehicle for electric or hybrid vehicles are commonly known.

Known vehicles with an electric drive comprise an electric engine with an a rotating rotor, e.g., an interior permanent magnet synchronous motor or a rotating electric engine having the rotor mounted thereon, and a vehicle drive apparatus. Typically, a rotor of an electric engine comprises a rotor carrier with a cylindrical support structure for receiving magnetic-flux creating and magnetic-flux leading components.

There are electric machines capable of different operation modes, one for producing torque or driving power for driving a vehicle, in a driving mode, and one to convert kinetic energy of the vehicle into electric energy, in a conversion mode. In a driving mode, such a rotor generates by magnetic interaction with the stator of the electric engine driving power or braking torque in order to accelerate or retard the vehicle. In a conversion mode, the rotor is rotated by the motion of the vehicle and produces by magnetic interaction with the stator of the electric engine electric energy for feeding it into a vehicle power supply.

In both operation modes, the torque generated by the rotor or applied to the rotor must be absorbed from the supporting structure and bearings carrying the rotor which requires a structural configuration capable of dealing with the mechanical load, in particular when load changes occur by changing between the operation modes.

In the automotive sector, there is a large number of ongoing electric and hybrid vehicle developments. Common approaches include at least one to four powerful electric motors in the range of a few kW up to 200 kW to provide driving power to the vehicle. Such engines are safety-critical, since they directly affect the driving of the vehicle. Accordingly, diagnostic systems for the motor are desirable. Yet, there does not exist any particular diagnostic system for the rotor of an electric engine or motor.

The rotor of an electric engine or motor may encounter various errors or failure situations, for example, fracture of the bars in an asynchronous induction motor or additional power losses in the metal components, which may result in a demagnetization of magnets within magnetic-flux creating components and/or magnetic-flux leading components of the motor.

SUMMARY OF THE INVENTION

The present invention aims to provide a diagnostic system for the rotor of an electric engine or motor for use in electric or hybrid vehicles. Said goals can be achieved by means of the subject-matters of the accompanying independent claims. Further embodiments of the present invention are defined by the dependent claims, respectively.

In terms of a basic concept of the invention, a system is provided for monitoring and/or diagnosing an electric engine or motor, in particular the rotor of an electric engine or motor for use in electric or hybrid vehicles, wherein said rotor is monitored by at least one sensor sensing one or more physical observables or operation parameters. The present invention can be applied to any kind of electric engine or motor that comprises a rotor.

An aspect of the present invention resides in the observation that at least some errors or failure situations of an electric motor can be discovered and detected by a temperature increase of the rotor. According to an embodiment of the present invention, using a temperature sensor adapted to sense or measure the temperature in the rotor, the operation condition of the rotor can be monitored. In the case of an error or failure situation by detection of high temperature or exceeded temperature of the rotor, the motor can be brought in a safe operation mode, and thus the motor can be protected against total failure. Thereby, an insecure situation for the vehicle caused by an electric motor failure can be avoided. Furthermore, more severe damages or the complete breakdown of the motor due to the detected error or failure condition can be avoided by the present invention.

According to another embodiment of the present invention, an acceleration sensor is used that is adapted to monitor the rotation frequency of the rotor. The acceleration sensor is arranged and adapted in order to sense accelerations or vibrations of the rotor in axial and/or radial direction with respect to the center or rotation axis of the rotor.

According to still another embodiment of the present invention, a rotor position sensor is used that is adapted to monitor the rotor position. By means of the rotor position sensor the radial position of the rotor can be detected. In case of detected accelerations or vibrations of the rotor at a certain position of the rotor, the respective radial position of the rotor can be determined via the rotor position sensor. The acceleration sensor is arranged at the rotor in a direction, such that it can be used to determine the angle of the radial rotor position. A combination with an upside/downside sensor allows the rotor position sensor to be checked and obviates the necessity for a sensor with 360° angular resolution; in consequence, a sensor with only a 180° angular resolution can be used.

According to still another embodiment of the present invention, the measurement result of a first sensor is used to monitor functionality of a second sensor. Thus, the measurement results of one sensor can be used to confirm or monitor functionality of another sensor.

According to another embodiment of the present invention, a magnetic field sensor and/or an antenna is arranged in the rotor that is adapted to monitor the magnetic field and/or the magnetic-flux at the rotor. The measurement results of such a magnetic field sensor can be used, for example, to activate a sensor system, which then performs further sensor measurements of the rotor and/or motor.

According to another embodiment of the present invention, at least one or more sensors are provided with a wireless transmitter capable to wireless transmit the measurement results or signals of the one or more sensors to a wireless receiver arranged outside or apart of the rotor and/or motor. The wireless transmitter and wireless receiver can be realized, for instance, as an inductive signal transmission system or as a radio transmission. The wireless receiver is adapted to provide the received sensor signals via wire line or wireless connection to any analytic or diagnostic component. Said analytic or diagnostic component is adapted to analyze the received sensor signals with respect to the operation condition of the rotor and/or motor and to discover or detect any error or failure situation of the rotor and/or motor.

Using a diagnostic system with sensor measurement according to the present invention makes it possible to extend the operating range or lifetime of the rotor and/or the electric engine by avoiding critical operation situations, critical temperatures or briefly boosting the performance. For induction motors, the present invention provides the possibility for efficiency optimization, as the rotor resistance may be better estimated via the measured rotor temperature, whereby the engine performance can be improved as a whole.

According to another embodiment of the present invention, one or more preferably wireless sensors are arranged at the rotor of the electric engine for sensing temperature, acceleration and/or the magnetic field in the rotor. As there may occur strong magnetic fields in the rotor, it is possible to obtain the power supply for the sensors via energy harvesting from the motion of the rotor. This can be achieved, via inductive energy generation or harvesting electric energy from the motion of the rotor. The wireless transmission system of the present invention requires little or no maintenance and can easy be integrated in the electrical motor.

As to another aspect of the present invention, the measurement abilities of tire pressure sensors can be used to determine operation conditions of the rotor in an electric motor. Therefore, in another embodiment of the present invention, Infineon's tire pressure sensor (TPMS SP37 or SP40) is used as a rotor sensor, which provides one or more of the following functionalities: temperature measurement, acceleration measurement, wireless radio frequency (RF) interface, and a receiver interface.

According to another embodiment of the present invention, Infineon's tire pressure sensor (PMA5110) is used as a rotor sensor, which does not comprise an accelerometer, but an external analog to digital converter to be connected to other sensors.

According to another aspect of the present invention, a radio frequency sensor capable of wirelessly transmitting measurements signals (RF transmission) is arranged on the rotor of an electric motor for sensing temperature of the rotor, acceleration, the direction of the acceleration and/or the magnetic field in the rotor. For this sake, e.g., a TPMS sensor can be mounted on the rotor, which measures acceleration and temperature of the rotor and provides RF transmission of the temperature signal and evaluation of the acceleration signal as a position signal. Additionally, the electromagnetic field of the motor can be measured and the measurement results can be used for analysis and diagnosis of the function of the rotor and the electric engine as a whole.

According to another aspect of the present invention, a diagnostic system is provided comprising a control unit. According to another aspect of the present invention, the control unit may be adapted to take into account limiting conditions of the rotor and/or the electric motor, such as revolutions per minute, wheel speed, normal range of temperatures, etc. In case preset limiting conditions of the rotor and/or the electric motor are exceeded, the control unit may generate a respective warning signal to a user or the control unit may generate a control signal to modify the operation conditions of the rotor and/or the electric motor such that the operation conditions stay within said limiting conditions.

BRIEF DESCRIPTION OF THE DRAWINGS

The accompanying drawing is included to provide a further understanding of the present invention and are incorporated in and constitute a part of this specification. The drawing illustrates an embodiment of the present invention and together with the description serves to explain the principles of the present invention. Other embodiments of the present invention and many of the intended benefits of the present invention will be readily appreciated as they become better understood by reference to the present description. The elements of the drawing are not necessarily to scale relative to each other.

Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The lone FIGURE illustrates a schematic sectional view of an electric motor in accordance with an exemplary embodiment of the present invention.

Since the present invention can be applied to any kind of electric engine or motor, in the FIGURE only parts or components of an electric engine or motor are shown that are helpful in describing the present invention.

DETAILED DESCRIPTION OF ILLUSTRATIVE EMBODIMENTS

The parts of the electric motor shown in The FIGURE comprise a stator 1 that is supported via a bearing or shaft 2. Depending on the kind of electric engine or motor the stator may be fixed or supported such that it may rotate around the shaft 2. The stator part encompasses, at least in part, a rotor 3 that is supported via a bearing or shaft 4 such that the rotor 3 can rotate in the stator 1.

The stator 1 is substantially shaped like an open cylinder with an outer and an inner circumferential surface substantially axis symmetrical with respect to a center or rotation axis A shown as dotted line. One or more electromagnetic field producing components or coils 6 are arranged at the outer circumferential cylinder surface of the stator 1.

The electromagnetic field producing components or coils 6 are arranged and adapted, when under electric power, to produce an electromagnetic field that inductively influences the rotor 3 inside of the stator 1. Thus, the stator 3 functions as a carrier of the rotor 3 with a cylindrical support structure for receiving magnetic-flux creating and magnetic-flux leading or magnetic-flux sensitive components 5 and 6.

The stator 1 comprises rods 5 protruding in radial direction from the inner circumferential cylinder surface of the stator 1. The rotor 3 is also shaped like an open cylinder substantially axis symmetrical with respect to center or rotation axis A and with an outer and an inner circumferential surface. Rods 5 are protruding in radial direction from the outer circumferential cylinder surface of the rotor 3. Thus, the rotor 3 comprises a cylindrical support structure for receiving magnetic-flux leading or magnetic-flux sensitive components 5.

The rods 5 protruding from the inner circumferential cylinder surface of stator 1 and the rods 5 protruding from the outer circumferential cylinder surface of rotor 3 overlap and engage with each other to enable and support inductive interaction between the stator 1 and the rotor 3, when the electromagnetic field producing components 6 are provided with electric power. Due to this inductive interaction the rotor 3 is forced to move within the stator 1 and to rotate around a center or rotation axis A. The generated torque or rotation of rotor 3 is used and transmitted via shaft 4 as driving power or kinetic energy of the electric engine or motor M.

According to an aspect of the present invention the rotor 3 of the electric motor M is monitored by at least one sensor sensing one or more physical observables or operation parameters. For this sake, as shown in the exemplary embodiment of the FIGURE, the rotor 3 is provided with at least one sensor S sensing one or more physical observables or operation parameters.

The at least one sensor S is arranged and adapted to measure one or more physical observables or operation parameters that influence or are affected by the operation of the motor M. Such physical observables or operation parameters that influence or are affected by the operation of the motor M are, for instance, rotation frequency or rpm, vibration, angle of the radial rotor position, temperature, acceleration and movement in radial and/or axial direction of the rotor 3.

As shown in the FIGURE, one or more sensors S can be arranged, for instance, at the shaft 4 of the rotor 3 in a radial distance from the center or rotation axis A. As also shown in the FIGURE, said one or more sensors S can be alternatively arranged, for instance, at a front side of the rotor 3 in a central position with respect to center or rotation axis A. In these positions the sensors S may measure the rotation frequency or rpm, vibration, angle of the radial rotor position, temperature, acceleration and movement in radial and/or axial direction of the rotor 3, inductivity or electric resistance of inductive field generating components of the motor M.

A temperature sensor S can be used to sense or measure the temperature in the rotor 3. Thus, at least some errors or failure situations of an electric motor may be discovered and detected by a temperature increase of the rotor 3. In the case of an error situation detected by high temperature or exceeded temperature of the rotor 3, the motor can be brought in a safe operation mode, e.g., by means of reducing power, limiting revolutions per minute (rpm) or even switching off the motor M. Thereby, an insecure situation for the vehicle caused by an electric motor failure can be avoided. Furthermore, more severe damages or the complete breakdown of the motor due to the detected error or failure condition can be avoided by the present invention.

An acceleration sensor S can be used to measure and monitor the rotation frequency of the rotor 3. The acceleration sensor S may be further adapted to be sensible for accelerations or vibrations of the rotor 3 in axial and/or radial direction. Alternatively or in addition, a rotor position sensor S may be used to measure and monitor the position of the rotor 3 in a radial or axial direction.

A magnetic field sensor S can be used to monitor the magnetic field and/or the magnetic-flux within the rotor 3. In case more than one sensor S is used, the measurement result of one sensor S can be used to confirm or monitor functionality of another sensor S.

The at least one sensor S is generating electric signals corresponding to the physical observable the sensor S measures. These sensor signals can be provided to analytic or diagnostic components (not shown) for analytic purposes, e.g., determination whether the respective physical observable is within a predetermined range or has exceeded a certain threshold.

These sensor signals can be transmitted via a wireline connection or via wireless transmission. Therefore, at least one or more sensors S can be connected to or provided with a wireless transmitter 10 capable of wirelessly transmitting the sensor signals or measurement results to a wireless receiver 14 which is coupled to one or more analytic or diagnostic components 12 arranged outside or apart of the rotor 3 and/or motor M. For this sake, an antenna 18 can be arranged at the rotor 3 or within motor M to wirelessly transmit the sensor signals. Multiple wireless transmitters 10 are shown to indicate that wireless transmitters 10 may be connected to, i.e., separate from, or provided with, i.e., included within, sensors S. Said analytic or diagnostic component 12 is adapted to analyze the received sensor signals with respect to the operation condition of the rotor 3 and/or motor M and to discover or detect the any error or failure situation of the rotor 3 and/or motor M.

In a combination of different aspects of the present invention, a radio frequency sensor capable of wirelessly transmitting measurements signals via RF transmission, e.g., a TPMS sensor, can be arranged on the rotor 3 for sensing temperature, acceleration, direction of the acceleration and/or the magnetic field.

The sensors S are arranged in the area of magnetic fields driving the motor M. Therefore, the sensors S can be provided inductive elements capable of acquiring energy from the motion of the rotor 3 or harvesting energy from the magnetic field generated by the motor M. Such inductive elements are illustrated as energy harvesters 16 attached to sensors S.

Although an exemplary embodiment of the present invention has been described in connection with the FIGURE showing a combination of a rotor and a stator, the present invention can be applied to any kind of electric engine or motor that comprises a rotor.

While specific configurations and arrangements have been discussed, it is understood that this is done for illustrative purposes only. A person skilled in the pertinent art will recognize that other configurations and arrangements can be used without departing from the spirit and scope of the present invention. It will be apparent to a person skilled in the relevant art that this invention can also be employed in a variety of other applications.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for monitoring an electric drive motor, the system comprising a first sensor configured to sense a first plurality of operation parameters and a second sensor, wherein
  a rotor of an electric engine or motor is monitored by the first sensor,
  the first plurality of operation parameters comprises two or more of vibration, temperature, acceleration and movement in an axial direction of the rotor, inductivity, and electric resistance of inductive field generating components of the motor,
  the rotor of the electric engine or motor is monitored by the second sensor,
  the second sensor is configured to sense a second plurality of operation parameters comprising two or more of rotation frequency, the vibration, the temperature, the acceleration and the movement in the axial direction of the rotor, the inductivity, and the electric resistance of the inductive field generating components of the motor,
  the first sensor is attached to a first surface of the rotor at a radial distance from an axis of rotation of the rotor, wherein the first sensor does not intersect the axis of rotation of the rotor, and
  the second sensor is attached to a second surface of the rotor, wherein the second sensor intersects the axis of rotation of the rotor.

2. The system according to claim 1, wherein the first sensor is further configured to measure at least one of: the rotation frequency, angle of radial rotor position, and acceleration and movement in a radial direction of the rotor.

3. The system according to claim 1, further comprising a wireless transmitter associated with the first sensor and the second sensor, the wireless transmitter configured to wirelessly transmit measurement results or signals of the first sensor and the second sensor to a wireless receiver of a diagnostic system.

4. The system according to claim 1, wherein at least one of the first sensor and the second sensor comprises a tire pressure monitoring system (TPMS) sensor.

5. The system according to claim 4, wherein the TPMS sensor comprises a TPMS SP37 or SP40.

6. A method for monitoring an electric engine or motor, the method comprising monitoring a rotor of the electric engine or motor by a first sensor and a second sensor sensing a plurality of operation parameters, wherein
  the plurality of operation parameters comprises two or more of vibration, temperature, acceleration and movement in an axial direction of the rotor, inductivity, and electric resistance of inductive field generating components of the motor, and
  monitoring the rotor of the electric engine or motor comprises
    using the first sensor attached to a first surface of the rotor at a radial distance from an axis of rotation of the rotor to monitor a first operation parameter, wherein the first sensor does not intersect the axis of rotation of the rotor, and
    using the second sensor attached to a second surface of the rotor to monitor a second operation parameter, wherein the second sensor intersects the axis of rotation of the rotor.

7. The method according to claim 6, further comprising diagnosing an operation parameter of the plurality of operation parameters in order to detect an error or failure of the rotor.

8. The method according to claim 6, wherein at least one of the first sensor and the second sensor comprises a temperature sensor to sense or measure a temperature at the rotor.

9. The method according to claim 8, wherein at least one of the first sensor and the second sensor further comprises an acceleration sensor adapted to sense or measure accelerations and/or vibrations of the rotor in an axial and/or radial direction of a rotation axis of the rotor.

10. The method according to claim 9, wherein at least one of the first sensor and the second sensor further comprises a rotor position sensor adapted to monitor axial position of the rotor.

11. The method according to claim 10, wherein the rotor position sensor is further adapted to monitor radial position of the rotor.

12. The method according to claim 9, wherein at least one of the first sensor and the second sensor further comprises a magnetic field sensor adapted to sense or measure inductive resistance, magnetic field and/or magnetic-flux at the rotor.

13. The method according to claim 6, wherein a measurement result of the first sensor is used to confirm functionality of the second sensor.

14. The method according to claim 13, wherein the measurement result of the first sensor is used to activate the second sensor.

15. The method according to claim 6, further comprising diagnosing the electric engine or motor using a result of sensing the plurality of operation parameters.

16. The method of claim 6, wherein at least one of the first sensor and the second sensor comprises a tire pressure monitoring system (TPMS) sensor.

17. A diagnostic system for monitoring an electric engine or motor for use in an electric or hybrid vehicle, the diagnostic system comprising:
  a circuit for measuring a plurality of operation parameters at a rotor of the electric engine or motor; and
  a diagnostic circuit configured to:
    receive a result of measuring the plurality of operation parameters,
    compare the result of measuring the plurality of operation parameters to a threshold, and
    determine a diagnostic status indicating operation conditions of the electric engine or motor based on comparing the result of measuring the plurality of operation parameters to the threshold, the operation conditions comprising error or failure information,
  wherein the circuit for measuring comprises a first radio frequency sensor configured to wirelessly transmit measurements signals, the first radio frequency sensor being arranged at the rotor for sensing the plurality of operation parameters, wherein the plurality of operation parameters comprises temperature of the rotor, acceleration, and a direction of the acceleration in the rotor, and
  wherein
    the circuit for measuring further comprises a second radio frequency sensor configured to wirelessly transmit measurements signals, the second radio frequency sensor being arranged at the rotor for sensing temperature of the rotor, acceleration, a direction of the acceleration and a magnetic field in the rotor,
    the second radio frequency sensor is attached to a first surface of the rotor at a radial distance from an axis of rotation of the rotor, wherein the second radio frequency sensor does not intersect the axis of rotation of the rotor, and the first radio frequency sensor is attached to a second surface of the rotor, wherein the first radio frequency sensor intersects the axis of rotation of the rotor.

18. The diagnostic system according to claim 17, further comprising a control unit configured to set operation limits of the rotor and/or the electric motor with respect to the plurality of operation parameters.

19. The diagnostic system according to claim 18, wherein the control unit generates a respective warning signal to a user and/or the control unit generates a control signal to control or modify operation conditions of the electric motor such that the operation conditions stay within the operation limits.

20. The diagnostic system according to claim 17, wherein the plurality of operation parameters further comprises rotation frequency.

21. The diagnostic system according to claim 17, wherein the first radio frequency sensor comprises a TPMS SP37 or SP40.

22. A diagnostic system for monitoring an electric engine or motor for use in an electric or hybrid vehicle, the diagnostic system comprising:
 a circuit for measuring a plurality of operation parameters at a rotor of the electric engine or motor; and
 a diagnostic circuit configured to:
  receive a result of measuring the plurality of operation parameters,
  compare the result of measuring the plurality of operation parameters to a threshold, and
  determine a diagnostic status indicating operation conditions of the electric engine or motor based on comparing the result of measuring the plurality of operation parameters to the threshold, the operation conditions comprising error or failure information,
 wherein
  the circuit for measuring comprises a plurality of wireless sensors arranged at the rotor of the electric engine for sensing the plurality of operation parameters, the plurality of operation parameters comprising temperature, acceleration, electric resistance of inductive field generating components of the motor, and a magnetic field at the rotor, and
  the plurality of wireless sensors comprises:
   a first sensor attached to a first surface of the rotor at a radial distance from an axis of rotation of the rotor, wherein the first sensor does not intersect the axis of rotation of the rotor, and
   a second sensor attached to a second surface of the rotor, wherein the second sensor intersects the axis of rotation of the rotor.

23. The diagnostic system according to claim 22, wherein the plurality of wireless sensors are configured to obtain power supply via inductive energy generation or harvesting electric energy from motion of the rotor and/or a magnetic field at the rotor.

24. The diagnostic system according to claim 22, wherein the plurality of wireless sensors comprises at least one tire pressure monitoring system (TPMS) sensor.

* * * * *